United States Patent
Haverinen et al.

(10) Patent No.: US 7,356,627 B2
(45) Date of Patent: Apr. 8, 2008

(54) DEVICE IDENTIFICATION

(75) Inventors: Anssi Haverinen, San Diego, CA (US); Pekka Karppinen, Helsinki (FI); Antti Latva-aho, Kangasala (FI); Neil Webb, Farnham (GB)

(73) Assignee: Nokia Corporation, Espoo (FI)

( * ) Notice: Subject to any disclaimer, the term of this patent is extended or adjusted under 35 U.S.C. 154(b) by 309 days.

(21) Appl. No.: 10/617,454

(22) Filed: Jul. 10, 2003

(65) Prior Publication Data

US 2005/0010698 A1 Jan. 13, 2005

(51) Int. Cl.
*G06F 13/12* (2006.01)
(52) U.S. Cl. .................. 710/62; 710/3; 710/4; 700/24; 711/1; 711/2; 711/3; 711/4; 711/5; 711/6
(58) Field of Classification Search ............... 710/62, 710/3, 4; 700/24
See application file for complete search history.

(56) References Cited

U.S. PATENT DOCUMENTS

| | | | |
|---|---|---|---|
| 4,727,474 A | 2/1988 | Batcher | 364/200 |
| 6,161,213 A * | 12/2000 | Lofstrom | 716/4 |
| 6,192,431 B1 * | 2/2001 | Dabral et al. | 710/62 |
| 6,415,339 B1 * | 7/2002 | Farmwald et al. | 710/23 |
| 6,738,788 B1 * | 5/2004 | Horng et al. | 707/104.1 |

2001/0054102 A1 12/2001 Kacines

FOREIGN PATENT DOCUMENTS

| CN | 1392706 A | 1/2003 |
|---|---|---|
| EP | 0 436 932 | 7/1991 |

OTHER PUBLICATIONS

M. Morris Mano and Charles R. Kime, "Logic and Computer Design Fundamentals", Date 1997, 2000, 2001, 2004, Pearson Prentice Hal, Third Edition, pp. 622-624.*

* cited by examiner

*Primary Examiner*—Niketa I. Patel
(74) *Attorney, Agent, or Firm*—Harrington & Smith, PC

(57) ABSTRACT

A data handling device capable of operating in a system in which two or more devices are connected by a data bus for the transmission of communications therebetween, the data bus having two or more data lines and the device having: two or more data bus connectors, each for connection to a respective data line of the data bus; an identity acquisition unit capable of functioning in a first mode of operation of the device to receive data transmitted over the data bus and in response to the order in which the bits of one or more data words of a predetermined form are received on the data bus connectors during the first mode of operation determine an identity for the device and store the identity in an identity store of the device; and a data handling unit capable of functioning in a second mode of operation of the device to handle communications transmitted over the bus and that specify the identity stored in the data store as a destination.

12 Claims, 3 Drawing Sheets

DEVICE IDENTIFICATION

FIELD OF THE INVENTION

This invention relates to the identification of interconnected devices, most preferably electronic devices interconnected on a circuit board.

DESCRIPTION OF RELATED ART

FIG. 1 shows three integrated circuit devices 1, 2, 3 interconnected on a circuit board 6. The devices are interconnected by electrically conductive lines defining a bus 4. The electrically conductive lines could be defined by wires and/or conductive strips. The bus 4 includes address, data and control lines.

When one of the integrated circuit devices 1, 2, 3 wants to read or write data from another one of the devices it accesses that other device over the bus 4. Since the bus 4 is connected to all of the devices, there has to be a mechanism for identifying the device that is being accessed. There are several approaches.
1. One approach is to provide a set of dedicated device selection lines, as shown at 5 in FIG. 1. One device selection line is provided for each of the devices 1–3, and each device selection line is connected to a respective device selection pin on each device. The assertion of the line corresponding to a device at the time an access is made over the bus 4 identifies that that access is destined for that device. This approach has the disadvantages that the device selection lines 5 occupy valuable space on the circuit board 6, and that the maximum number of devices that can be interconnected is limited to the number of device selection lines that are available and to the number of device selection pins on the devices.
2. Another approach is for the devices to share a common address space. In that way the address that is specified on a read or write operation implicitly indicates the device that is being accessed. In this system the device selection lines 5 can be omitted, as can the corresponding device selection pins on the devices. However, this system requires the devices to have been pre-configured so that each knows which part of the common address space has been allocated to it. This is difficult in practice because the devices are often designed independently, and the devices may even be identical (e.g. if a series of memory chips are connected to the bus 4).

There is a need for an improved means for allowing devices to be identified as the target for access operations.

SUMMARY OF THE INVENTION

According to one aspect of the present invention there is provided a data handling device capable of operating in a system in which two or more devices are connected by a data bus for the transmission of communications therebetween, the data bus having two or more data lines and the device having: two or more data bus connectors, each for connection to a respective data line of the data bus; an identity acquisition unit capable of functioning in a first mode of operation of the device to receive data transmitted over the data bus and in response to the order in which the bits of one or more data words of a predetermined form are received on the data bus connectors during the first mode of operation determine an identity for the device and store the identity in an identity store of the device; and a data handling unit capable of functioning in a second mode of operation of the device to handle communications transmitted over the bus and that specify the identity stored in the data store as a destination.

According to a second aspect of the present invention there is provided a method for assigning an identity to a data handling device capable of operating in a system in which two or more devices are connected by a data bus for the transmission of communications therebetween, the data bus having two or more data lines and the device having two or more data bus connectors, each connected to a respective data line of the data bus, the method comprising: in a first mode of operation of the device, receiving data transmitted over the data bus and in response to the order in which the bits of one or more data words of a predetermined form are received on the data bus connectors during the first mode of operation determining an identity for the device; and storing the identity in an identity store of the device.

The identity acquisition unit may preferably be arranged to process the or each data word of a predetermined form in accordance with a look-up table in order to determine the identity for the device. Alternatively, it could use a stored algorithm or state engine or another means.

The device may comprise a multiplexing arrangement located between the data bus connectors and the data handling unit and arranged to, in at least the second mode of operation, re-order in accordance with the stored identity data received from at least two of the data lines of the bus and passed to the data handling unit. The multiplexing arrangement may be implemented in hardware or software.

The identity acquisition unit is preferably arranged to determine the identity in accordance with a deviation in the order of at least some of the bits of the or each said data word from a standard order, and the multiplexing arrangement is arranged to re-order the data lines of the bus so as to restore the standard order to the bits as applied to the data handling unit.

The device may be a data processor, a memory device or a more complex functional device. The device may be implemented on a single integrated circuit, or could be formed of two or more interconnected components. The bus may be localised on a circuit board, or may permit communication with external devices. The device may be defined on an integrated circuit. The data bus connectors may be connectors for communicating to and/or from the integrated circuit.

The present invention also provides a data handling system comprising two or more data handling devices as set out above interconnected by the said data bus.

The data handling system may comprise a further device connected to the bus and may be capable of functioning to transmit the said one or more data words of a predetermined form over the data bus.

The further device may be capable of triggering the data handling devices to enter the first mode of operation.

The data handling devices may be arranged to automatically enter the first mode of operation an initialisation of the system.

The said method may comprise, in a second mode of operation of the device, handling by means of a data handling unit of the device communications transmitted over the bus and that specify the identity stored in the data store as a destination.

BRIEF DESCRIPTION OF THE DRAWINGS

The present invention will now be described by way of example with reference to the accompanying drawings, in which.

DETAILED DESCRIPTION OF THE INVENTION

In a conventional arrangement, a bus has a number of lines. Each device to which the bus is to connect has the same number of dedicated pins for connection to the bus. A protocol will define the significance of each line of the bus. Each device is connected to the bus such that pin n of the device is connected to line n of the bus. Thus the signal on line n of the bus is treated by each device as representing the signal on line n as specified by the bus protocol.

Figure 1:
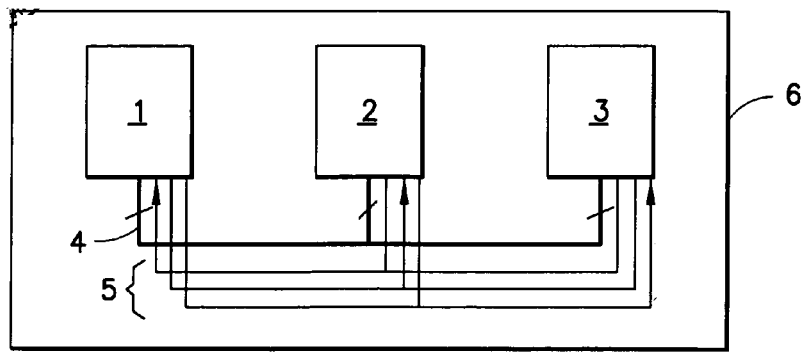
FIG. 1 shows a prior art arrangement comprising devices interconnected on a circuit board.
Figure 2:
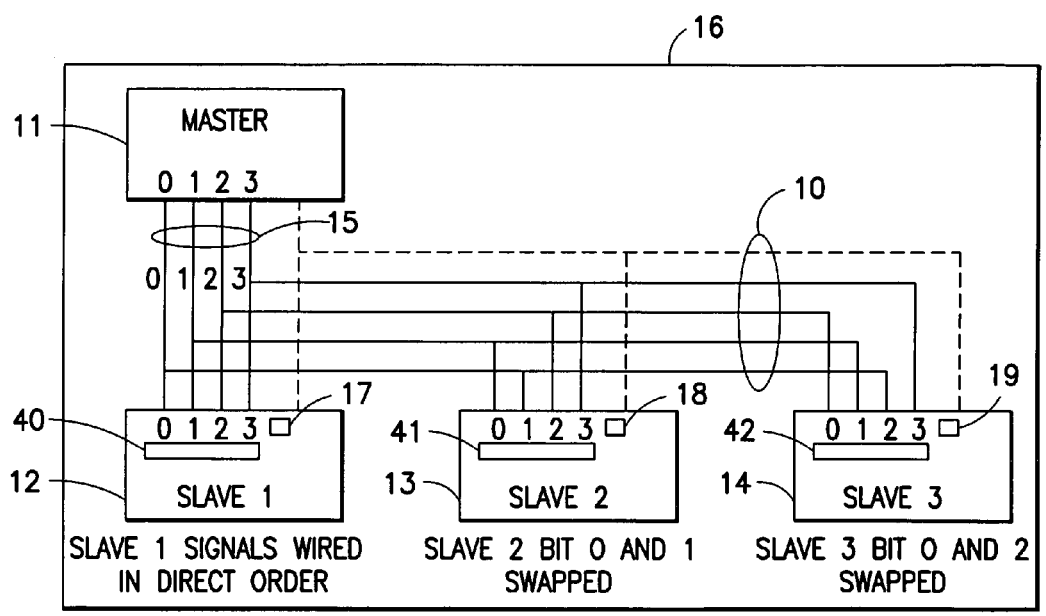
FIG. 2 shows an arrangement comprising four interconnected devices.

In the arrangement of FIG. 2, an address, data and control bus 10 connects the devices 11, 12, 13, 14 together. In contrast to the arrangement described above, the bus is not connected straightforwardly to the other devices. Four lines (15) of the bus are used as device configuration lines, and these are connected to each of the devices in a different permutation from that in which they are connected to others of the devices. Prior to the normal operation of the bus a configuration phase is executed. In the configuration phase a configuration signal is sent over the device configuration lines of the bus by one of the devices (11), acting as a master device. Due to the differences in permutation the configuration signal is received differently by each of the other devices (12–14), acting as slave devices. Each of the slave devices adopts a device identification based on the configuration signal as it has received it. This device identification is used in subsequent normal operation of the bus to identify that device when it is to be accessed for data reads, data writes or other operations over the bus.

The arrangement of FIG. 2 will now be described in more detail.

FIG. 2 shows a circuit board 16, on which are four devices 11–14. The devices could, for instance, be integrated circuits (ICs), logical devices or devices formed of discrete components. The devices are interconnected by a bus 10. The bus is formed of a number of electrically conductive lines, which are preferably constituted by tracks defined on the circuit board. Each line of the bus is connected to a respective input/output terminal of each device, for example to a respective pin in the case where the device is an IC.

One of the devices (11) acts as a master device in that it generates the configuration signal during the execution of the configuration phase. The other devices (12–14) act as slave devices in that they accept a device identification during the configuration phase.

Four lines of the bus 10 serve as configuration lines. The configuration lines are connected to the slave devices in different orders. In this example the configuration lines are lines 0 to 3 of the bus. The configuration lines are connected to pins 0 to 3 of the devices in the orders shown in the following table:

|  | Line | | | |
|---|---|---|---|---|
|  | 0 | 1 | 2 | 3 |
|  | Connected to pin | | | |
| Device 11 | 0 | 1 | 2 | 3 |
| Device 12 | 0 | 1 | 2 | 3 |
| Device 13 | 1 | 0 | 2 | 3 |
| Device 14 | 2 | 1 | 0 | 3 |

When the system is initialised it automatically enters the configuration phase for a predetermined length of time. The devices are pre-configured to operate in a configuration mode for that length of time. Other methods of selecting the configuration mode are possible: for example the master device could signal the slave devices to enter the configuration mode by transmitting a signal of a predetermined form over the bus.

In the configuration mode the master device transmits the configuration signal to the slave devices. In this example the configuration signal is the data 1000 sent over the configuration lines 0 to 3 respectively. Other forms of configuration signal could be used, and examples are described in more detail below.

When the configuration signal 1000 is transmitted by device 11, it is received differently by each of the slave devices as a result of the difference in order with which the configuration lines are connected to each of the other devices. In the present example the configuration signal is received by each of the devices as shown in the following table:

| Signal as transmitted by device 11 | 1 | 0 | 0 | 0 |
| Signal as received by device 12 | 1 | 0 | 0 | 0 |
| Signal as received by device 13 | 0 | 1 | 0 | 0 |
| Signal as received by device 14 | 0 | 0 | 1 | 0 |

Each device adopts an identity based on the configuration signal as it has received it. In this example, the devices adopt an identity based on an index corresponding to the line on which they received a 1 bit during the configuration phase. Thus, device 12 adopts identity 0, device 13 adopts identity 1, and device 14 adopts identity 2. The master device adopts a pre-assigned identity outside the range assigned to the slave devices, for example identity 7. Each slave device includes an identity store 17, 18, 19, in which it stores its identity for use during normal operation.

After the configuration phase the system enters the normal operation phase. In the normal operation phase, the devices are addressed by each other over the bus 10 using the identities assigned during the configuration phase. In other respects the bus 10 functions as a normal address, data and control bus during the normal operation phase. To overcome the differences in order of the bus lines as connected to each of the slave devices, each of the slave devices has a multiplexing arrangement 40, 41, 42 connected to its configuration inputs. This is set up to normalise the order of the bus lines as connected to the device during normal operation. The operation of the multiplexing arrangements is described in more detail below.

Thus, during normal operation one of the devices may wish to write data to an address at another one of the devices. To do so, it sets the control lines of the bus to indicate a write operation and to indicate the identity of the target device at which the write is to be performed, sets the address lines of the bus to indicate the address at which data is to be written, and sets the data lines to indicate the data that is to be written. The other devices monitor the state of the bus. When a device detects that the bus indicates a write operation specifying its own identity as the target it performs the specified write operation in its memory space. Similarly, during normal operation one of the devices may wish to read data from an address at another one of the devices. To do so, it sets the control lines of the bus to indicate a read operation and to indicate the identity of the target device at which the read is to be performed and sets the address lines of the bus to indicate the address from which data is to be read. When a device detects that the bus indicates a read operation specifying its own identity as the target it performs the specified read operation in its memory space and then returns the read data over the bus.

Each device may be hardware configured to act as a master or slave. Alternatively, each device may be capable of acting as a master or a slave and may detect automatically which it is to be in dependence on the manner of its connection to the bus. The master device may be a dedicated unit for assigning the device identities and which does not perform any function during normal operation of the device.

Figure 3:
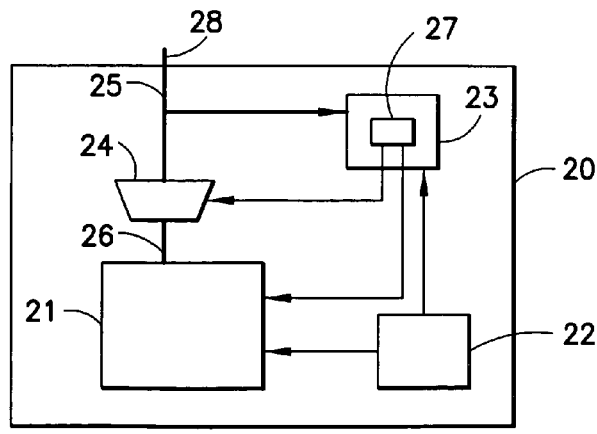
FIG. 3 shows the general architecture of a device.

As indicated above, each slave device has a multiplexing arrangement for normalising the order of the bus lines during normal operation of the device. The multiplexing may be performed in hardware or software. The preferred arrangement is that the multiplexing is performed in hardware by means of a multiplexing circuit arranged between the device's connections to the bus and the section of the device that processes, stores or otherwise handles data during normal operation of the device. FIG. 3 shows schematically the structure of a device including such a multiplexing circuit. The device 20 of FIG. 3 includes processing section 21, control unit 22, identity acquisition unit 23 and multiplexer 24. The lines of the data bus 28 are connected to the input pins of the device in an order that can indicate to the device its identity, as described above. In the device the data bus is conveyed in that order to the multiplexer 24 and the identity acquisition unit 23. The control unit 22 selects between operation of the identity acquisition unit 23 (in the configuration phase) and the processing section 21 (in the normal operation phase) based on prestored logic. For example, the control unit may cause the configuration phase to be entered for a set time period after the device has been turned on and thereafter for the device to operate normally. During the configuration phase the identity acquisition unit monitors the bus 25 to receive the configuration signal and determines the device's identity. The identity is stored in a data store 27. At the end of the configuration phase the multiplexer 24 is set based on the stored identity so that in the portion of the bus 26 that leads from the multiplexer 24 to the processing section 21 the bus is correctly ordered. The data store is made available to the multiplexer so that it can hold its connection state and to the processing unit 21 so that it can use the identity to select communications over the bus that are destined for the device.

Figure 4:
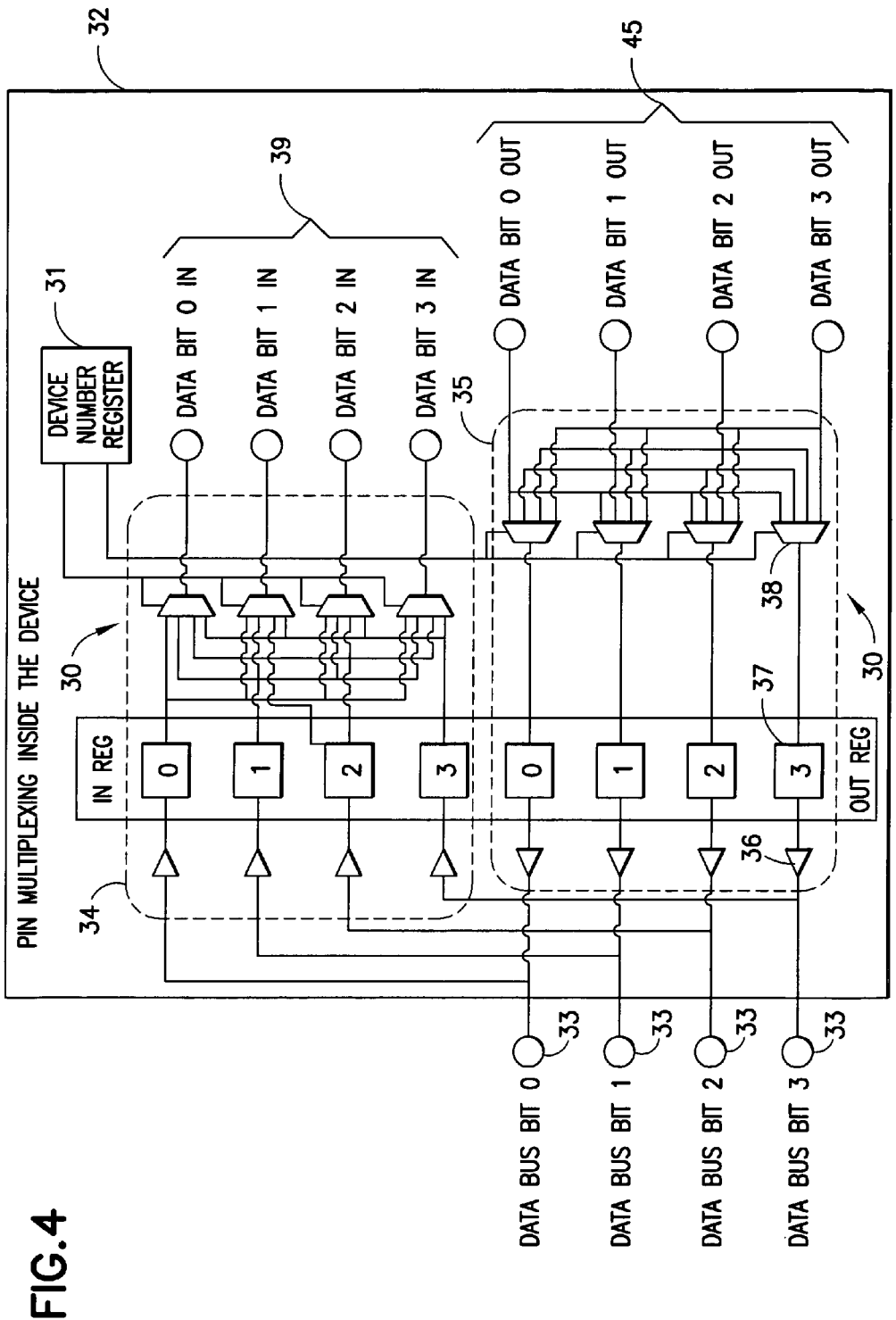
FIG. 4 shows a multiplexing arrangement of a device.

FIG. 4 shows a multiplexing arrangement 30 suitable for use in the system of FIG. 2 and analogous to multiplexing arrangements 40–42. FIG. 4 also shows an identity store 31 analogous to identity stores 17–19. In the arrangement of FIG. 4 the device 32 has configuration pins 33 for connection to the configuration lines (which are not shown in FIG. 4). The multiplexing arrangement comprises two channels: an input channel 34 and an output channel 35. Each channel is isolated from the other by buffers (e.g. buffer 36) on the lines between the pins 33 and the channels 34, 35. Each channel includes a register (e.g. register 37) for each line for holding the state of that line in accordance with normal bus operation. Each channel also includes a set of multiplexers (e.g. multiplexer 38) connected between the input 39 or output 45 to the data processing section of the device. The multiplexers are responsive to the content of the identity store 31. The multiplexers are arranged as shown in FIG. 4 so as to be able to re-order the lines of the bus for input and output to the data processing section (which is not shown in FIG. 4) so that they are presented to the data processing section as if the device were connected to the bus with the lines in the normal order. The other lines of the bus, which are not reordered, run in parallel with the arrangement shown in FIG. 4.

As indicated above, the device that is the master after power up/reset of the system, will execute an initialisation procedure over the bus. In a preferred embodiment the steps during the initialisation are that the master device indicates to the other devices that there is going to be an initialisation procedure. This is typically done using the control part of the bus. Then, the master device will drive into the data bus one or more predefined words to allow each other devices to determine the cross wiring that has been applied to it.

After the predefined word(s) have been applied the devices can derive their device IDs using a either predefined table to map each possible cross wiring set-up to a device ID, or by calculating the ID directly using an algorithm. Then the devices can compensate for the cross wiring effects by setting their multiplexers that interface to the external data bus according to the cross wiring.

Where more than one predefined word is used in the initialisation procedure, a greater number of devices can be configured. However, the words should be written into the bus in a predefined order. The number of parallel data lines in the bus and the maximum number of devices that is needed in the bus determine the number of these words needed.

If:
  $N_d$=number of data bits in the bus
  $N_c$=number of configuration words needed
then:
  Maximum number of devices=$N_d!$
  Minimum number of code words needed for $N_d!$ devices=Ceiling($\log_2(N_d)$)

Figure 5:
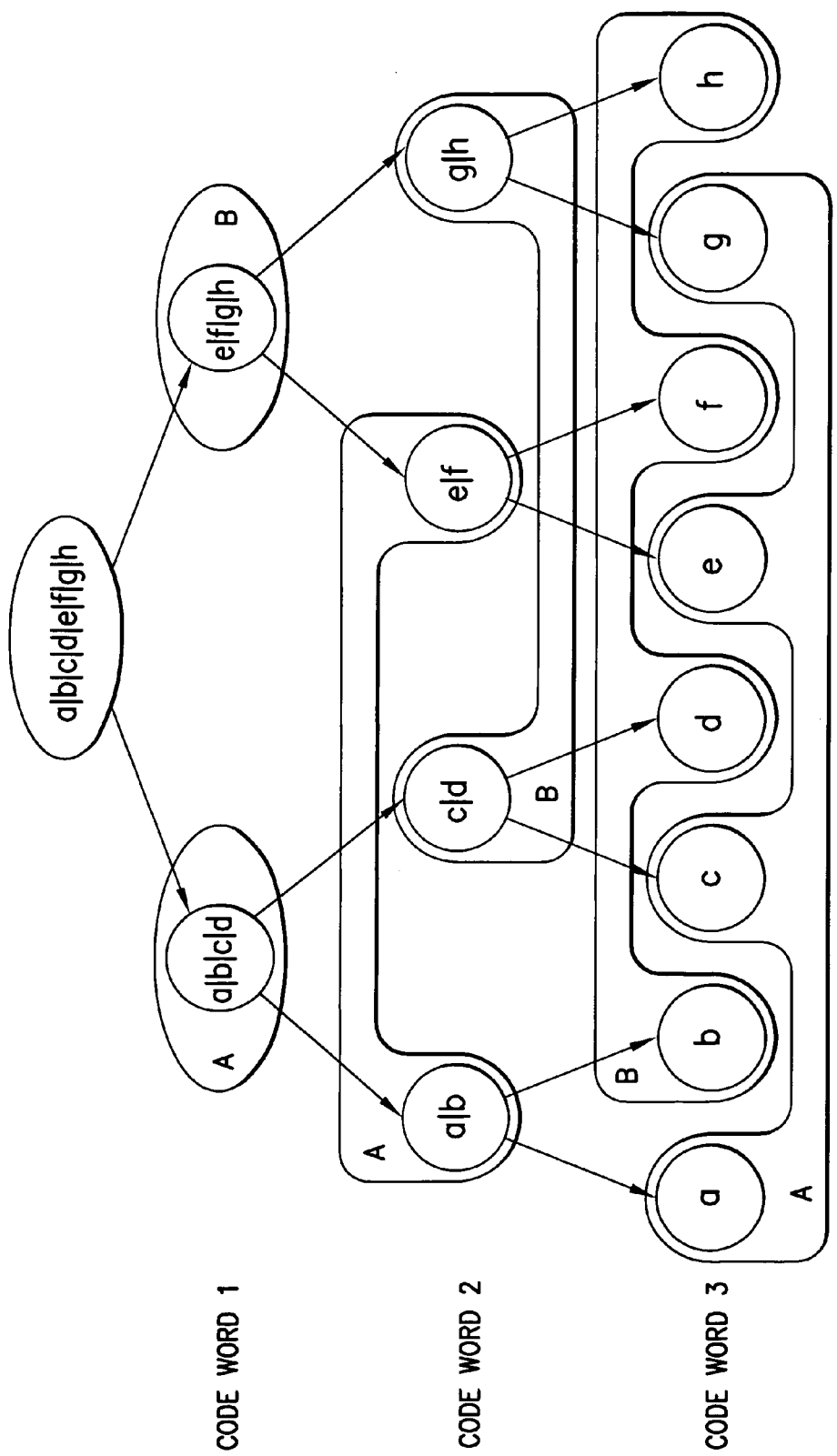
FIG. 5 shows a decision tree for processing received data words.

This problem can be characterised as a tree diagram as illustrated in FIG. 5. Before any code words are sent, every data line is equally likely to be cross-wired into this particular input line. This is the position at the top of the tree. For maximum efficiency the possibilities bifurcate at each level. This can be achieved in practice by using the code words of which half of the bits are zeros and the other half are ones. In the example of FIG. 5, suppose the first code word to be sent has bits {a,b,c,d} (i.e. group A) set to 1 and the remaining {e,f,g,h} bits (i.e. group B) set to 0 (or the other way around). Then depending what was the input value for this particular input line, a device can decide whether the correct input line for this bit is in group A or in group B. For example, if the input value for this bit using this code word '11110000' was 1, it can be decided that the last four bits cannot be mapped to this bit, but any of the first 4 bits can be.

At the next level of the tree the possibilities are again split into two groups. However, this time the groups are interleaved from those of the previous level: group A is now {a,b,e,f} and group B is now {c,d,g,h} and the code word for separating these two groups is the one which has the bits in group A set to 1 and in group B to 0 (or the other way around). This same pattern is followed until the final level is reached and it is then possible to unambiguously decide the input line order and so the device identifier and the correct setting for this multiplexers.

It will be noted that the groupings at different levels can be made in a number of different ways, and that other code words could be used. Certain possibilities could be less efficient than the ones shown here and might require a greater number of number of words to be sent. The words sent to the devices to allocate their identities may have any number of bits greater than or equal to 2. Preferred numbers of bits are 2, 4, 8, 16, 32 etc.

When there are plenty of lines available and the time to perform device initialisation is critical, the devices can be identified using a single code word and hence a single-cycle identification period is possible. The code word should be selected in such a way that it provides maximum information. In this situation, if $I(x_i)$ denotes the information in bits, $x_i$ is an event and $P(x_i)$ is the probability function of the event then:

$$I(x_i) = -\log_2 P(x_i)$$

In order to maximise information, the probability of the code word appearing exactly in a certain way has to be minimised. This can be done by using the following equation for calculating the number of permutations for each code word in providing a different word by reordering the bits in the code word.

$$C(n, r) = \frac{n!}{r!(n-r)!} = \binom{n}{r}, \quad 0 \le r \le n$$

Here $C(n,r)$ denotes the number of different combinations with no reference to order, when from n distinct objects, a selection of r is made. To maximise the information $C(n,r)$ has to be maximised. To do this, the nominator $r!(n-r)!$ has to be minimised. This can be seen easily from the definition of factorisation that r should be n/2.

Thus, to maximise the information a single code word can provide, the number of bits being 0 and 1 should be equal, or in case of the code words with odd number of bits, number of 0s and 1s should be as close to each other as possible. Then the number of different devices identifiable by this code word is:

$$C(n) = \binom{n}{n/2}, \text{ for even } n$$

$$C(n) = \binom{n}{n-1/2}, \text{ for odd } n$$

The actual value of the word here is irrelevant, as long as it has the defined number of bits set to 1 and 0.

Other code word arrangements may alternatively be used.

Instead of a hardware multiplexer, the device may be configured to re-order the input and output lines of the bus in software, for example by using logical operations on the data received and to be transmitted over the bus.

The device may be any data handling device, for example a data processor or a memory device. The device is preferably an integrated circuit device. The device is preferably an electronic device.

Any suitable protocol can be used during the subsequent operation of the bus. Examples include master-slave and peer-peer protocols. In the case of a master-slave protocol the bus master for normal operation need not be the same as the master during initialisation of the device identities.

The configuration phase may be entered in response to any of a number of conditions. Examples include it being entered automatically following a power on or reset of the system, in response to a request by at least one of the devices connected to the bus, in response to the connection of an additional device to the bus, or at the start of each or at least some of the transactions on he bus. The latter case could be implemented by each such bus transaction having a pre-amble for bus configuration as described above. This case is likely to be beneficial for master-slave buses that generally carry rather long data packets (e.g. 100 bytes or longer.). This way the slave device does not need to have robust (long-term) storage of its identification as it can determine it from the 'pre-amble'. A second potential benefit is that the bus does not need to provide a mechanism for slaves to request for identification. And a third is that this would allow the slaves to be powered down completely and then to be powered back up again for normal operation without a need for entering into the initialisation procedure as a distinct step after power-up.

The device ID, address and data could, in normal operation, all be combined on to the same bus. However, this is not essential. For instance, either the device ID, or the address, or both, can be written into a separate bus to optimise for speed (e.g. since memory interfaces can be very sensitive to extra cycles caused by address, device ID etc.). Thus the present system may provide a mechanism e.g. for memory chips to obtain their ID and thus remove a need for dedicated chip select lines. This can, for example, become beneficial when a system has e.g. 16 memory chips that would require 16 chip selects, since this could be reduced down to a 4-pin chip select bus.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

What is claimed is:

1. A data handling apparatus capable of operating in a system in which two or more devices are connected by a data bus for a transmission of communications therebetween, the data bus having two or more data lines and each of the two or more devices having:

two or more data bus connectors, each for connection to a respective data line of the data bus;

an identity acquisition unit capable of functioning in a first mode of operation of the device to receive data transmitted over the data bus and in response to the order in which the bits of one or more data words of a predetermined form are received on the data bus connectors during the first mode of operation determine an identity for the device and store the identity in an identity store of the device;

a data handling unit capable of functioning in a second mode of operation of the device to handle communications transmitted over the bus and that specify the identity stored in the identity store as a destination; and a multiplexing arrangement located between the data bus connectors and the data handling unit and arranged to, in at least the second mode of operation, re-order in accordance with the stored identity data received from at least two of the data lines of the bus and passed to the data handling unit.

2. The data handling apparatus as claimed in claim 1, wherein the identity acquisition unit is arranged to process each of the one or more data words of a predetermined form in accordance with a look-up table in order to determine the identity for the device.

3. The data handling apparatus as claimed in claim 1, wherein the multiplexing arrangement is a hardware multiplexing arrangement.

4. The data handling apparatus as claimed in claim 1, wherein the identity acquisition unit is arranged to determine the identity in accordance with a deviation in the order of at least some of the bits from a standard order of each of the one or more data words, and the multiplexing arrangement is arranged to re-order the data lines of the bus so as to restore the standard order to the bits as applied to the data handling unit.

5. The data handling apparatus as claimed in claim 1, wherein the device is a data processor.

6. The data handling apparatus as claimed in claim 1, wherein the device is a memory device.

7. The data handling apparatus as claimed in claim 1, wherein the device is defined on an integrated circuit and the data bus connectors are connectors for communicating with the integrated circuit.

8. A data handling system comprising two or more data handling devices, each of the two or more data handling devices comprising:

a data bus;

two or more data bus connectors, each for connection to a respective data line of the data bus;

an identity acquisition unit capable of functioning in a first mode of operation of the device to receive data transmitted over the data bus and in response to the order in which the bits of one or more data words of a predetermined form are received on the data bus connectors during the first mode of operation determine an identity for the device and store the identity in an identity store of the device;

a data handling unit capable of functioning in a second mode of operation of the device to handle communications transmitted over the bus and that specify the identity stored in the data store as a destination; and a multiplexing arrangement located between the data bus connectors and the data handling unit and arranged to, in at least the second mode of operation, re-order in accordance with the stored identity data received from at least two of the data lines of the bus and passed to at least one of the data handling unit.

9. The data handling system as claimed in claim 8, comprising a further device connected to the bus and capable of functioning to transmit the said one or more data words of a predetermined form over the data bus.

10. The data handling system as claimed in claim 9, wherein the further device is capable of triggering the data handling devices to enter the first mode of operation.

11. The data handling system as claimed in claim 9, wherein the data handling devices are arranged to automatically enter the first mode of operation upon initialisation of the system.

12. A method for assigning an identity to each of two or more devices of a data handling apparatus capable of operating in a system in which said two or more devices are connected by a data bus for the transmission of communications therebetween, the data bus having two or more data lines and the device having two or more data bus connectors, each connected to a respective data line of the data bus, the method comprising:

in a first mode of operation of the device, receiving data transmitted over the data bus and in response to the order in which the bits of one or more data words of a predetermined form are received on the data bus connectors during the first mode of operation determining an identity for the device;

storing the identity in an identity store of the device;

in a second mode of operation of the device, handling by means of a data handling unit of the device communications transmitted over the bus and that specify the identity stored in the identity store as a destination; and in at least the second mode of operation, re-ordering the data lines, via a multiplexing arrangement located between the data bus connectors and the data handling unit, in accordance with the stored identity data received from at least two of the data lines of the bus and passed to the data handling unit.

* * * * *